United States Patent [19]
Hobbs

[11] Patent Number: 5,125,366
[45] Date of Patent: Jun. 30, 1992

[54] WATER INTRODUCTION IN INTERNAL COMBUSTION ENGINES

[76] Inventor: Cletus L. Hobbs, Box 152, Rte. 8, Harrisonburg, Va. 22801

[21] Appl. No.: 775,447

[22] Filed: Oct. 15, 1991

Related U.S. Application Data

[63] Continuation-in-part of Ser. No. 598,005, Oct. 11, 1990, abandoned.

[51] Int. Cl.⁵ ............................................. F02B 47/02
[52] U.S. Cl. .................. 123/25 C; 123/25 J
[58] Field of Search .................. 123/25 C, 25 J, 25 R, 123/509, 514, 516, 25 A

[56] References Cited

U.S. PATENT DOCUMENTS

| | | | |
|---|---|---|---|
| 4,290,392 | 9/1981 | Dissmore | 123/25 C |
| 4,301,655 | 11/1981 | Thomas | 60/712 |
| 4,322,950 | 4/1982 | Jepsen | 60/712 |
| 4,393,817 | 7/1983 | Lindberg | 123/25 R |
| 4,397,268 | 8/1983 | Brown | 123/25 R |
| 4,417,447 | 11/1983 | Thomas | 123/25 C |
| 4,502,420 | 3/1985 | Mezger | 123/25 C |
| 4,558,665 | 12/1985 | Sandberg et al. | 123/25 C |
| 4,979,482 | 12/1990 | Bartlett | 123/509 |
| 5,012,772 | 5/1991 | Nakamura | 123/25 C |

FOREIGN PATENT DOCUMENTS

| | | | |
|---|---|---|---|
| 2843335 | 4/1980 | Fed. Rep. of Germany | 123/25 J |
| 2226595 | 7/1990 | United Kingdom | 123/25 C |

*Primary Examiner*—E. Rollins Cross
*Assistant Examiner*—Erick Solis
*Attorney, Agent, or Firm*—John K. Donaghy

[57] ABSTRACT

An internal combustion engine is provided with water injectors and a source of pressurized water having at least one injector valve operated by a computer which senses various operating conditions of the engine and in response to said conditions opens or closes the injector valves allowing or blocking the passing of high pressure water into the combustion chamber.

4 Claims, 1 Drawing Sheet

WATER INTRODUCTION IN INTERNAL COMBUSTION ENGINES

This is a continuation-in-part of application Ser. No. 598,005 filed Oct. 11, 1990, now abandoned.

BACKGROUND OF THE INVENTION

1. Field of the Invention

This invention pertains to internal combustion engines and particularly to such engines where water is injected into the combustion chamber under precisely controlled conditions.

2. Background of the Prior Art

The benefits and gains in fuel economy by the injection of water into the cylinders of an internal combustion engine have long been known. However, all previously known methods of injecting water into the cylinder have inherent drawbacks in design, making mass production of water injected engines undesirable.

Representative of the prior art devices are the following patents: Woolf U.S. Pat. No. 864,877 shows an explosive engine having an inlet duct to the combustion chamber; Meyer U.S. Pat. No. 2,101,554 shows an internal combustion engine having a solenoid operated valve for injecting water into a secondary chamber; Butler U.S. Pat. No. 2,218,522 is an internal combustion chamber having a water injecting valve opening into the combustion chamber; French U.S. Pat. No. 2,489,177 shows a water injection valve in the engine cylinder; Lee U.S. Pat. No. 3,074,228 is a combined internal combustion and steam engine; Eft 4,018,192 discloses a water injection system for internal combustion engines; Thomas U.S. Pat. No. 4,417,441 shows a combustion chamber in the piston head; Van Dal U.S. Pat. No. 4,589,377 has an injector fitted in the combustion chamber; French U.S. Pat. No. 422,950 has a valve injector in the combustion chamber.

In all previous systems, the introduction of water into the combustion chamber was achieved by mechanical means—the injectors are mechanically driven by camshafts, gears or sprockets. In all of the prior known art, any gains made in fuel economy are offset by drawbacks in design. Many previous systems require major mechanical changes in engine design, some are antiquated and have an extensive number of parts prone to failure or breakdown. However, the main disadvantage to all currently known systems of water injection is that control over the injection of the water in response to changing engine requirements is very limited.

Two previously designed systems, (U.S. Pat. Nos. 4,502,420 and 4,558,665) have attempted to solve this problem by controlling the injectors with a computer or electronic control unit. However, these two designs are still mechanical in nature because although the injectors are computer controlled, the actual introduction of water into the cylinder is still limited and ultimately controlled by a mechanically operated valve (the intake valve of the engine). This is highly undesirable because the water can only enter the cylinder when the intake valve is open. Therefore, injection of water can only take place on the intake stroke of the piston.

SUMMARY OF THE INVENTION

The system herein described is unique in its introduction of water into all the cylinder chambers simultaneously or sequentially or one at a time at any given place in the engine cycle and is not restricted to any open or closed position of the intake valve.

It is one object of this invention to provide an internal combustion engine with a water injection which employs an electrical signal to operate an injector valve in response to predetermined engine conditions.

Another object of this invention is to provide a water injector for an internal combustion engine having a pressure regulator to keep the water pressure at a constant pressure.

Yet another object of this invention is to provide an internal combustion engine with a water injector that is controlled by a computer in response to the data provided by one or more sensors located at various points on the engine.

And another object of this invention is to provide an internal combustion engine with a water injector which receives data from a computer in response to the sensing of a sensor mounted on the intake manifold where manifold pressure is measured as engine load increases.

And yet another object of this invention is to provide an internal combustion engine with a water injector which is controlled by a computer which selects the proper volume of water to be injected into the engine in relation to such factors as engine load, engine temperature, and the octane of the fuel.

These and other objects of the invention will become apparent to those skilled in the art of which the invention pertains from a reading of the following specifications when taken with the annexed drawings.

DESCRIPTION OF THE PREFERRED EMBODIMENT OF THE INVENTION

Figure 1:
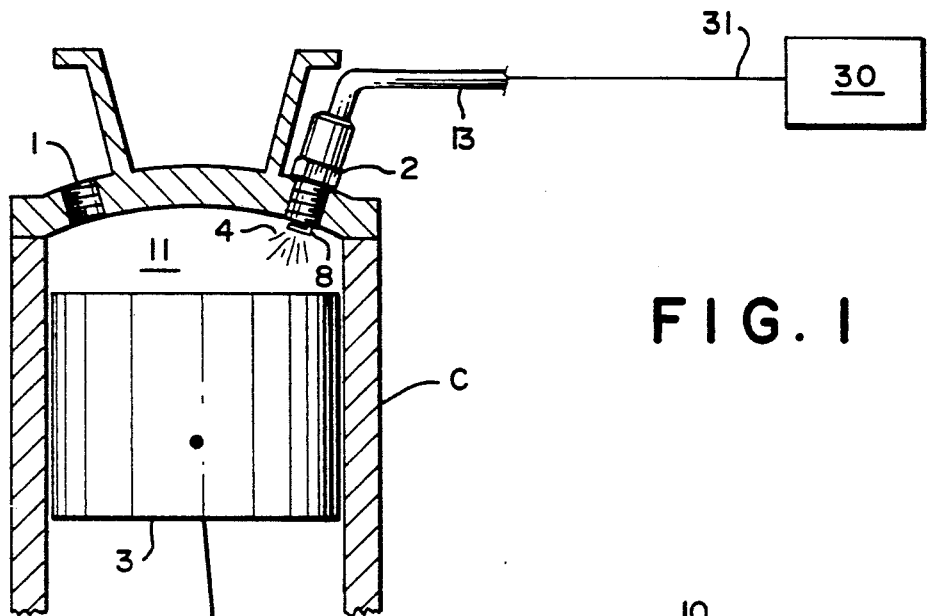
FIG. 1 is a cross-sectional view of an engine showing a water injector therein.

Referring now in more detail to the drawings, FIG. 1 shows an engine cylinder C having a spark plug opening 1, a water injector 2, a piston 3 and a crankshaft 6.

Figure 2:
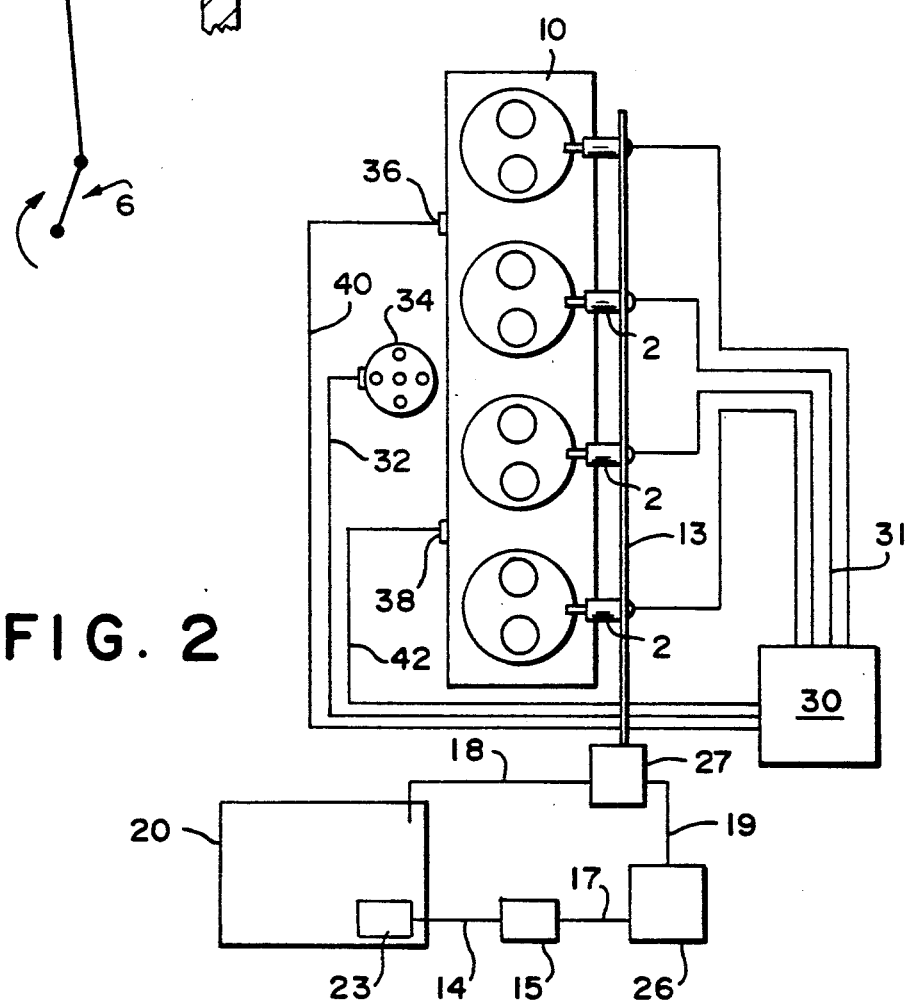
FIG. 2 is a block diagram showing an internal combustion engine with a central computer having electrical connections to various sensors on the engine.

It will be understood that the cylinder head 10, FIG. 2, has a plurality of injectors 2 extending into the chambers. Since all injectors are identical, only one will be described.

The water injector 2 is fitted to the cylinder C by threading or the like. The nozzle 8 has an opening communicating with the interior of combustion chamber 11. The injectors 2 have a water supply conduit 13 leading to a source of water 20 such as a tank located at any convenient location on the engine or its support. This water source may be pressurized by any suitable means. The injector 2 is controlled by a computer 30.

It will be understood that fuel will be supplied into the chamber 11 in the usual manner.

The tank 20 has a water delivery pump 23 therein. This pump keeps a steady flow of water to a high pressure pump 26. A line 14 connects the pump 23 to a filter 15 which has a line 17 to a high pressure injector pump 26. This high pressure injector pump 26 is remote from the engine cylinder head 10 and has a line 19 to a water pressure regulator 27. The regulator 27 is also remote from the engine and both as a single unit is removably attached to the injector conduit 13 and water tank by any suitable means such as clamp means. A return line 18 is connected between the regulator 27 and the tank 20. The advantage to having the pump 26 and regulator 27 as a unit facilitates ease of removing a defective unit and replace it with a new one.

A computer 30 has an input electrical connection line 32 from the distributor 34. A plurality of sensors 36 and 38 are attached to the cylinder head 10 and each has a connection 40 and 42 to the input of the computer 30. Each injector 2 has an electrical connector 31 to the computer 30. It will be appreciated that the injector 2 has a valve therein which is operated by the computer when it senses abnormal engine conditions through the sensors 36, 38 and/or distributor 34.

In operation, the computer senses an abnormal condition such as overheating or knock or engine load through the distributor 34 and/or sensors 36, 38 and computes a predetermined volume of water necessary for the engine to run at peak efficiency and then operates one or more of the injectors 2 to cause the water to be injected into any one of the combustion chambers, either sequentially or simultaneously, or single depending on the condition and the required change. The computer then opens one or more of the injectors 2 for a predetermined time allowing a spray of water to be injected into the combustion chamber 11. The high pressure pump 27 ensures an optimum pressure of water to the injectors 2, and the water supply pump 23 keeps a steady flow of water to the pump 26. Once the predetermined amount of water has been injected, the computer closes the injector 2, thus stopping flow of water into the combustion chamber 11.

My design is to provide a totally electronically/computer controlled system which will allow the engine to operate at peak efficiency. It solves problems that all the other systems have failed to solve.

This system is easily adoptable to any internal combustion engine, and is designed with a minimum of mechanical parts, therefore it is less prone to failure. The separable pump/regulator unit facilitates ease of replacing an inoperable unit. This system allows the injection of water at any point in the piston's cycle and is not dependent on the opening of internal valve.

This system will infinitely and instantaneously adjust itself to the requirements of the engine.

The amount of water injected, the point in the piston's cycle that injection takes place, and the length of time the injector remains open are all precisely controlled by the computer and can instantly change as the requirements of the engine change.

What I claim is:

1. A water injector for an internal combustion engine having combustion chambers comprising:
   injectors having nozzles communicating with the combustion chambers;
   a source of water connected to said injectors;
   a water delivery pump in said source of water for supplying a constant flow of water;
   a water supply conduit attached to each of the injectors and to said source of water;
   a remote high pressure pump connected between the source of water and the conduit;
   a remote water pressure regulator connected between said remote high pressure pump and said injectors;
   sensors on the engine for sensing normal and abnormal conditions of the engine during operation;
   a compouter connected to each of the injectors and to each of the sensors, said computer for sensing the engine conditions and for computing a predetermined volume of water to be injected into the engine to correct an abnormal condition, said predetermined volume of water injected into the combustion chambers by said remote high pressure pump, assisted by said water delivery pump.

2. A water injector for an internal combustion engine according to claim 1 wherein:
   said source of water is a water tank having an in tank water delivery pump therein.

3. A water injector for an internal combustion engine according to claim 1 wherein:
   a water pressure regulator between the high pressure pump and the injectors regulates the water pressure injected into the combustion chambers.

4. A water injector for an internal combustion engine according to claim 1, and:
   said high pressure pump and said pressure regulator being a single unit removably attached to said water supply conduit.

* * * * *